United States Patent
Lee et al.

(10) Patent No.: US 12,553,524 B2
(45) Date of Patent: Feb. 17, 2026

(54) SYSTEMS AND METHODS FOR SLIT VALVE CONTROL

(71) Applicant: Applied Materials, Inc., Santa Clara, CA (US)

(72) Inventors: YongJoo Lee, Seoul (KR); Jongmo Yeo, Seoul (KR); GunBum Lee, Gyeonggi-do (KR); Kiduk Kim, Gyeonggi-do (KR)

(73) Assignee: Applied Materials Inc., Santa Clara, CA (US)

( * ) Notice: Subject to any disclaimer, the term of this patent is extended or adjusted under 35 U.S.C. 154(b) by 27 days.

(21) Appl. No.: 18/613,441

(22) Filed: Mar. 22, 2024

(65) Prior Publication Data

US 2025/0297682 A1  Sep. 25, 2025

(51) Int. Cl.
*F16K 3/18* (2006.01)
*F16K 3/02* (2006.01)

(52) U.S. Cl.
CPC .............. *F16K 3/18* (2013.01); *F16K 3/0254* (2013.01)

(58) Field of Classification Search
CPC ...... F16K 3/18; F16K 3/0254; F16K 31/1245; F16K 31/122; F16K 31/124; F16K 37/0041; F16K 37/005; F16K 51/02; H01L 21/67772; H01L 21/67739
See application file for complete search history.

(56) References Cited

U.S. PATENT DOCUMENTS

| | | | | |
|---|---|---|---|---|
| 5,363,872 A | * | 11/1994 | Lorimer | F16K 1/10 414/217 |
| 9,752,703 B2 | * | 9/2017 | Kho | F16K 3/18 |
| 10,975,896 B2 | * | 4/2021 | Böhm | F15B 11/10 |
| 11,415,230 B2 | | 8/2022 | Wirth et al. | |
| 2002/0092569 A1 | * | 7/2002 | Maung | F16K 51/02 137/554 |
| 2006/0249701 A1 | | 11/2006 | Kurita et al. | |
| 2012/0247564 A1 | * | 10/2012 | Kho | F16K 3/188 251/318 |
| 2016/0377183 A1 | | 12/2016 | Coppola et al. | |
| 2020/0166154 A1 | * | 5/2020 | Eschenmoser | F16K 3/18 |

(Continued)

FOREIGN PATENT DOCUMENTS

| | | |
|---|---|---|
| CN | 204628723 U | 9/2015 |
| JP | 2000-199064 A | 7/2000 |
| JP | 2004257527 A * | 9/2004 ........... F16K 31/122 |

OTHER PUBLICATIONS

PCT International Search Report and Written Opinion for PCT/US2025/017032 dated Jun. 4, 2025.

*Primary Examiner* — Marina A Tietjen
(74) *Attorney, Agent, or Firm* — Moser Taboada

(57) ABSTRACT

Methods and apparatus for slit valve control are provided. In some embodiments, a slit valve system includes a slit valve body having an opening configured to permit passage of a substrate; a door in the valve body, configured to transition between an open position and a closed position in which the opening is closed; a pneumatic actuator coupled to the door, the pneumatic actuator including a moving member configured to exert a force on the door; and a controller coupled to the pneumatic actuator, the controller configured to control fluid pressure entering the pneumatic actuator based at least on a target actuation time of the door or target vibration of the door.

20 Claims, 3 Drawing Sheets

(56) References Cited

U.S. PATENT DOCUMENTS

| | | | |
|---|---|---|---|
| 2020/0182375 A1* | 6/2020 | Böhm | F16K 3/18 |
| 2021/0183664 A1* | 6/2021 | Loehnert | H01L 21/67017 |
| 2021/0301929 A1 | 9/2021 | Wirth et al. | |
| 2022/0146014 A1* | 5/2022 | Rieger | F15B 19/005 |

* cited by examiner

SYSTEMS AND METHODS FOR SLIT VALVE CONTROL

FIELD

Embodiments of the present disclosure generally relate to control of valves, for example, in semiconductor substrate processing systems, and, more particularly, to control of slit valves.

BACKGROUND

Semiconductor substrates are often processed in vacuum processing systems that include one or more chambers for performing substrate processing operations. The environment in the chambers during processing may be maintained at a sub-atmospheric pressure. Each chamber includes a slit valve opening controlled by a slit valve to seal the chamber and to allow transfer of substrates into and out of the chamber.

Each slit valve may be housed within a port sealed between slit valve openings of adjacent chambers. The ports typically house at least one door that is coupled to an actuator used to move the door between open and closed positions. The actuators are often pneumatic actuators.

Generally, the operation speed (between fully closed and open) of the door is important to the throughput of substrate processing system. However, the inventors have observed that faster door operations may result in large shocks or vibrations to the slit valve as the slit valve door opens and closes. The shocks or vibrations may propagate to one or more chambers, which may loosen and disperse particles within the chambers and/or displace substrates from precisely planned positions, which may create defects on the substrate in later processing operations. Additionally, shocks and vibrations may increase wear on components of the slit valve itself.

Therefore, the inventors have provided systems and methods for controlling slit valves that can reduce vibration and shock while maintaining throughput.

SUMMARY

Methods and apparatus for slit valve control are provided herein. In some embodiments, a slit valve system includes: a slit valve body having an opening configured to permit passage of a substrate; a door in the valve body, configured to transition between an open position and a closed position in which the opening is closed; a pneumatic actuator coupled to the door, the pneumatic actuator including a moving member configured to exert a force on the door; and a controller coupled to the pneumatic actuator, the controller configured to control fluid pressure entering the pneumatic actuator based at least on a target actuation time of the door or target vibration of the door.

In some embodiments, a substrate processing system includes: a first chamber having a first opening; a second chamber having a second opening; and a slit valve system coupled between the first opening and the second opening, the slit valve system comprising: a slit valve body having an opening configured to permit passage of a substrate; a door in the valve body, configured to transition between an open position and a closed position in which the opening is closed; a pneumatic actuator coupled to the door, the pneumatic actuator including a moving member configured to exert a force on the door; and a controller coupled to the pneumatic actuator, the controller configured to control fluid pressure entering the pneumatic actuator based at least on a target actuation time of the door or target vibration of the door.

In some embodiments, a method for controlling a slit valve system according to embodiments consistent with the present disclosure is described. In some embodiments, the method includes: receiving a target actuation time of the door or target vibration of the door; determining a pressure control signal based at least on the target actuation time or target vibration; and controlling fluid pressure entering the pneumatic actuator based on the determined pressure control signal.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
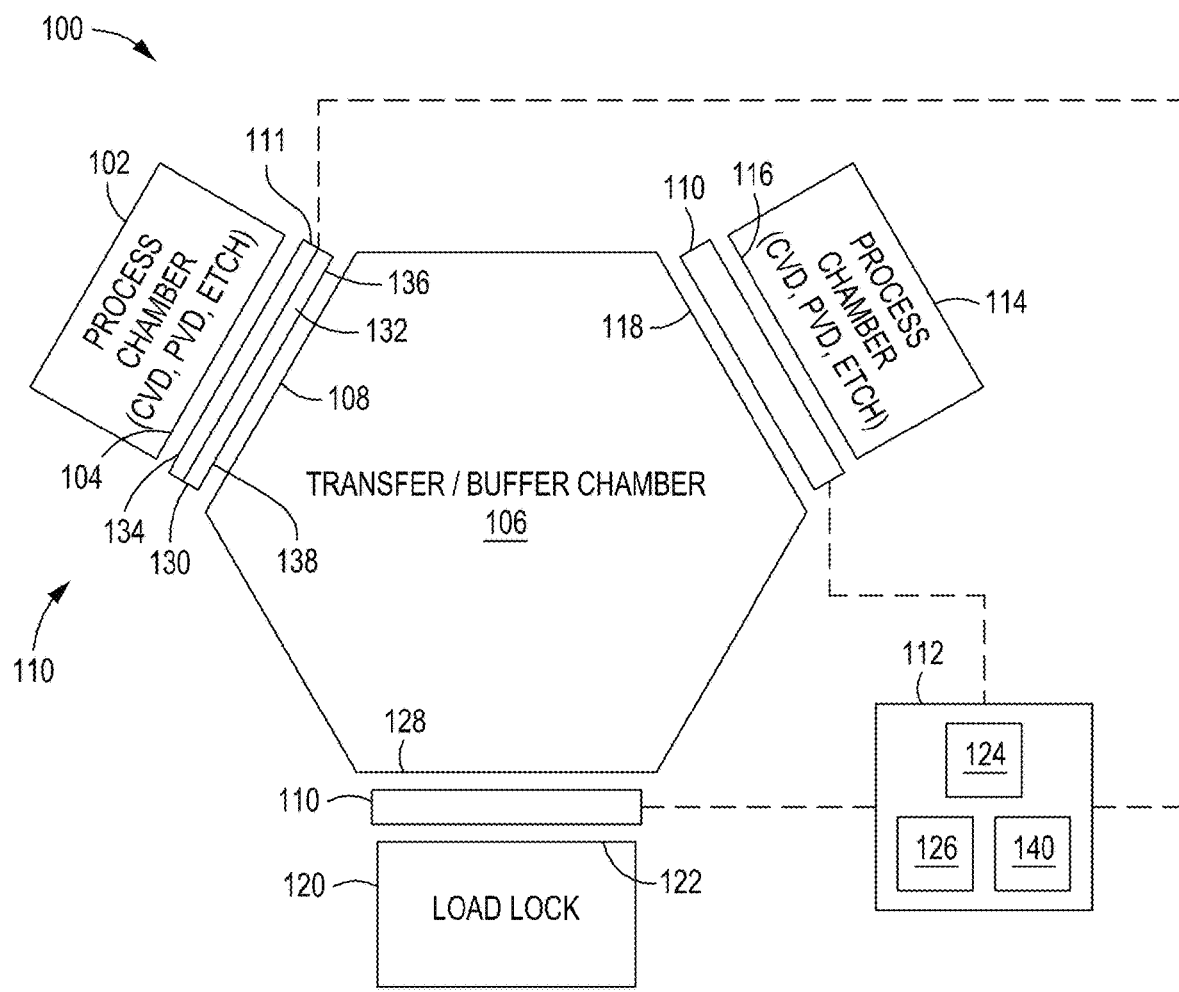
FIG. 1 depicts a substrate processing system in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Figure 2:
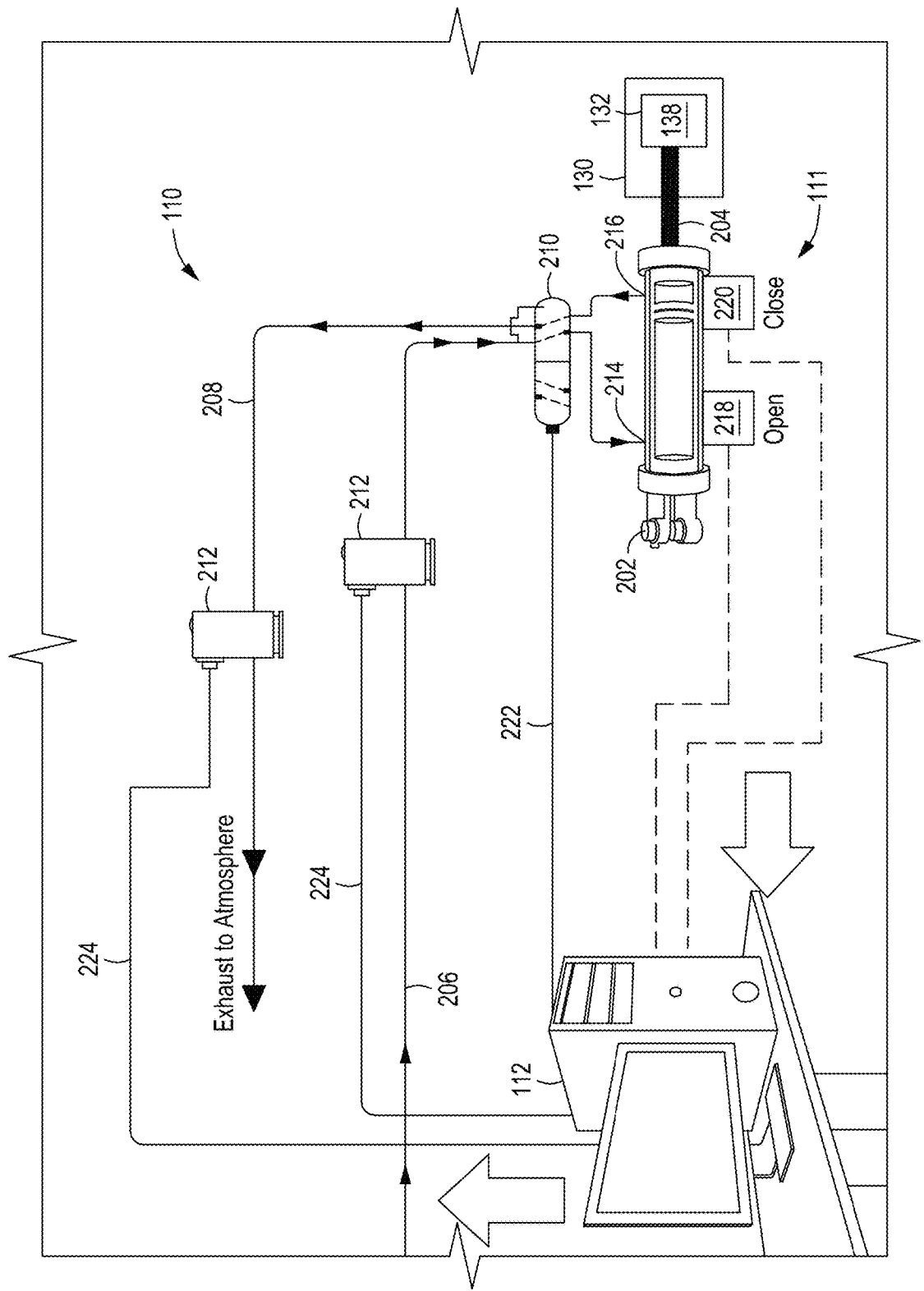
FIG. 2 depicts a slit valve system in accordance with some embodiments of the present disclosure.

Embodiments of a substrate processing system and slit valve system are provided herein. In some embodiments, and as shown in FIG. 1, a substrate processing system 100 is shown that includes a first chamber 102 (e.g., physical vapor deposition (PVD), chemical vapor deposition (CVD), etch, load lock, or other substrate processing chamber) having a first opening 104 configured to receive a substrate, a second chamber 106 (e.g., transfer chamber) having a second opening 108 configured to receive the substrate, and a slit valve system 110 sealingly coupled between the first opening 104 and the second opening 108. In some embodiments, and as shown in FIGS. 1 and 2, the substrate processing system 100 may include a controller 112 configured to control operation of the slit valve system 110 based on a target actuation time or target vibration (measured in units of gravitational constant "g", where 1 g is equal to 9.81 meter per second squared) to thereby reduce shock and vibration caused by operation of the slit valve system 110. As used herein "target actuation time" refers to the desired total time for a door 138 of the slit valve system 110 to move between an open position and a closed position and vice versa. Also, as used herein, "target vibration" refers to the desired maximum amount of vibration (measured in units of gravitational constant, g) of the door 138 as it the door 138 moves between its the open position and closed position. As used herein, "vibration" refers to free vibration that occurs when an object or structure, such as the first chamber 102, is displaced or impacted (e.g., as a result of actuation of the slit valve system 110) and then allowed to oscillate naturally.

In some embodiments and as shown in FIG. 1, the slit valve system 110 may include a slit valve 111 that is comprised of a slit valve body 130 having an opening 132 configured to permit passage of a substrate. In some embodiments, the slit valve body 130 may have a first side 134 (on one end of the opening 132) connected to the first opening 104 of the first chamber 102. The slit valve body 130 may have a second side 136 (on another end of the opening 132) connected to the second opening 108 of the second chamber 106. The slit valve 111 may also include a door 138 in the slit valve body 130. The door 138 may be configured to transition between an open position and a closed position (shown in FIG. 2) in which the opening 132 is closed to seal the first chamber 102 and prevent movement of a substrate between the first chamber 102 and the second chamber 106.

In some embodiments, and as shown in FIG. 1, the substrate processing system 100 may also include a third chamber 114 (e.g., physical vapor deposition (PVD), chemical vapor deposition (CVD), etch, load lock, or other substrate processing chamber) having a third opening 116 configured to receive a substrate. In some embodiments, and as shown in FIG. 1, the second chamber 106 may have a fourth opening 118 configured to receive the substrate from the third chamber 114 through a slit valve 111 of another slit valve system 110 connected between the third chamber 114 and the second chamber 106. In some embodiments, and as shown in FIG. 1, the substrate processing system 100 may include a fourth chamber 120 (e.g., physical vapor deposition (PVD), chemical vapor deposition (CVD), etch, load lock, or other substrate processing chamber) having a fifth opening 122 configured to receive a substrate. In some embodiments, and as shown in FIG. 1, the second chamber 106 may have a sixth opening 128 configured to receive the substrate from the fourth chamber 120 through another slit valve 111 of a slit valve system 110 connected between the fourth chamber 120 and the second chamber 106.

In some embodiments, the substrate processing system 100 may be configured as a cluster tool where the first chamber 102 and the third chamber 114 are process chambers, the second chamber 106 is a transfer/buffer chamber, and the fourth chamber 120 is a load lock chamber. To effectuate transport of a substrate amongst the first chamber 102, second chamber 106, third chamber 114, and fourth chamber 120, the second chamber 106 may contain a robotic transport mechanism (not shown). The transport mechanism illustratively may have a pair of substrate transport blades (not shown) attached to distal ends of a pair of extendible arms (not shown), respectively. The substrate transport blades may be used for carrying individual substrates to and from the first chamber 102 and third chamber 114. (i.e., the process chambers). Other configurations of the transport mechanism can also be used, such as single blade substrate transfer robots.

In operation, one of the substrate transport blades of the transport mechanism retrieves a substrate from a cassette (not shown) in the fourth chamber 120 (i.e., load lock chamber) and carries that substrate to a first stage of processing, for example, physical vapor deposition (PVD), in the first chamber 102. If the first chamber 102 is occupied, the robot waits and holds the substrate in the second chamber 106 (i.e., transfer/buffer chamber) until the processing is complete and then swaps substrates, i.e., removes the processed substrate from the first chamber 102 with one blade and inserts a new substrate with a second blade. Before blades perform a swap of substrates, the door 138 of the slit valve 111 must be opened to permit movement of the blades through the opening 132 into and out of the first chamber 102 or third chamber 114.

Once the substrate is processed (e.g., PVD of material upon the substrate), the substrate can be moved to a second stage of processing, and so on. For each move, the transport mechanism generally has one blade carrying a substrate and one blade empty to execute a substrate swap. The transport mechanism waits at each of the first chamber 102 and third chamber 114 (i.e., process chamber), until a swap can be accomplished.

Once processing is complete within the first chamber 102 and/or third chamber 114, the transport mechanism moves the substrate from the first chamber 102 or third chamber 114 (e.g., if the last process chamber) and transports the substrate to a cassette (not shown) within the fourth chamber 120.

As described in greater detail below, and with reference to FIG. 2, the controller 112 may be configured to receive sensor data from at least one sensor (e.g., first sensors 218, second sensor 220, and regulate, based at least on the sensor data, fluid pressure entering a pneumatic actuator 202 used to actuate the door 138.

In some embodiments, the controller 112 may include a processor 124 (programmable) that is operable with a memory 126 and a mass storage device, an input control unit, and a display unit (not shown), such as power supplies, clocks, cache, input/output (I/O) circuits, and support circuits 140 coupled to the various components of the substrate processing system 100 to facilitate control thereof. Support circuits 140 may be coupled to the processor 124 for supporting the processor 124 in a conventional manner.

The processor 124 may be one of any form of general-purpose computer processor that can be used in an industrial setting, such as a programmable logic controller (PLC), for controlling various chambers and sub-processors. The memory 126 coupled to the processor 124 and the memory 126 can be non-transitory computer readable storage medium and may be one or more of readily available memory such as random access memory (RAM), read only memory (ROM), floppy disk drive, hard disk, or any other form of digital storage, local or remote. Fluid flow regulation and other processes described herein are generally stored in the memory 126, typically as software routine. The software routine may also be stored and/or executed by a second processor (not shown) that is remotely located from the substrate processing system 100 being controlled by the processor 124.

The memory 126 may be in the form of computer-readable storage media that contains instructions, which when executed by the processor 124, facilitates the operation of the substrate processing system 100. The instructions in the memory 126 may be in the form of a program product such as a program that implements the method in accordance with embodiments of the present disclosure. The program code may conform to any one of a number of different programming languages. In one example, the disclosure may be implemented as a program product stored on a computer-readable storage media for use with a computer system. The program(s) of the program product define functions of the embodiments (including the methods described herein). Illustrative non-transitory computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such non-transitory computer-readable storage media, when carrying computer-readable instructions that direct the functions of the methods described herein, are embodiments of the present disclosure.

In some embodiments, and as shown in greater detail in FIG. 2, each slit valve 111 may include a pneumatic actuator 202 coupled to the door 138. The pneumatic actuator 202 may include a moving member 204 (e.g., a piston) configured to exert a force on the door 138 to move the door 138. The moving member 204 may be connected to the door 138 so that movement of the moving member 204 causes movement of the door 138 between an open position and a closed position (shown in FIG. 2).

In some embodiments, and as shown in FIG. 2, the slit valve system 110 may include a supply line 206 and an exhaust line 208 coupled to the pneumatic actuator 202. In some embodiments, the supply line 206 may be configured to supply a compressed gas, such as compressed dry air (CDA) or compressed dry nitrogen (CDN), which may be used to actuate the pneumatic actuator 202.

In some embodiments, the slit valve system 110 may include a switching valve 210 coupled to the supply line 206 and the exhaust line 208 between the controller 212 and the pneumatic actuator 202. In some embodiments, and as shown in FIG. 1, the pneumatic actuator 202 may have an inlet 214 and an outlet 216 connected to the switching valve 210. The switching valve 210 may be configured to reverse the direction of fluid flow between the inlet 214 and outlet 216 to reverse the direction of movement of moving member 204 and, thus, the direction of movement of the door 138.

The switching valve 210 may have a first position (shown in FIG. 2) that connects the supply line 206 to the inlet 214 and connects the exhaust line 208 to the outlet 216. The switching valve 210 may have a second position (not shown) that reverses the direction of flow between the inlet and outlet 216 and connects the supply line 206 to the outlet 216 and connects the exhaust line 208 to the inlet 214. In some embodiments, and as shown in FIG. 2, the switching valve 210 may be communicatively connected to the controller 112. The switching valve 210 may be configured to switch between the first position and the second position based on a position signal 222, which may be generated by, or otherwise received from, the controller 112.

In some embodiments, the slit valve system 110 may include a controller 212 (two are shown in FIG. 2) coupled to at least one of the supply line 206 or the exhaust line 208. Two controllers 212 are shown in FIG. 2, with one controller 212 in line with the supply line 206 and another one controller 212 in line with the exhaust line 208. In some embodiments, the two controllers 212 may be combined into a single controller 212 that may be coupled to both of the supply line 206 and the exhaust line 208. In some embodiments, the controller 212 may be in line with at least one of the supply line 206 or the exhaust line 208. The controller 212 may be configured as a mass flow controller (e.g., flowmeter) or a pressure controller (e.g., a regulator).

In some embodiments, and as shown in FIG. 2, the controller 212 may be communicatively connected to each controller 112. Each controller 112 may be configured to receive a pressure control signal 224, which may be generated by, or otherwise received from, the controller 212, and control fluid pressure entering the pneumatic actuator (entering at the inlet 214 or outlet 216 depending on closing or opening direction). By controlling the fluid pressure entering the pneumatic actuator, the amount of vibration and shock caused by actuating the door 138 can be controlled.

In some embodiments, the controller 212 may be configured to control fluid pressure entering the pneumatic actuator 202 based at least on the target actuation time of the door 138 or target vibration of the door 138. As used herein "target actuation time" refers to the desired total time for the door 138 to move between the open position and the closed position and vice versa. As used herein, "target vibration" refers to the desired maximum amount of vibration (measured in units of gravitational constant, g) of the door 138 as the door 138 moves between the open position and closed position. In some embodiments, the target vibration may be up to 0.5 g. It has been observed that if the target vibration is set above 0.5 g, vibrations imparted by the slit valve system 110 onto connected chambers such as the first chamber 102, can cause at least one of unwanted particle generation or unwanted shifting of substrates. In some embodiments, the range of values for acceptable target vibration may vary depending on the configuration and vibration characteristics of substrate processing system 100. The pressure control signal 224 may include a control pressure setpoint based at least on the target actuation time of the door 138 or target vibration of the door 138.

In some embodiments, and as shown in FIG. 2, the slit valve 111 may include a first sensor 218 configured to sense a first position of the moving member 204 corresponding to the open position of the door 138 and a second sensor 220 configured to sense a second position of the moving member 204 corresponding to the closed position of the door 138. In some embodiments, and as shown in FIG. 2, the controller 112 may be communicatively coupled to the first sensor 218 and the second sensor 220. In some embodiments, the controller 112 may be configured to record a first time when the first sensor 218 senses the first position and a second time when the second sensor 220 senses the second position, and to determine an elapsed time between the first time and the second time. The elapsed time is thus a measurement of the total actuation time of the door 138 between the open and closed positions. As described in greater detail below, the measured elapsed time may be used as a feedback input for determining the pressure control signal 224 to the controller(s) 212.

Figure 3:
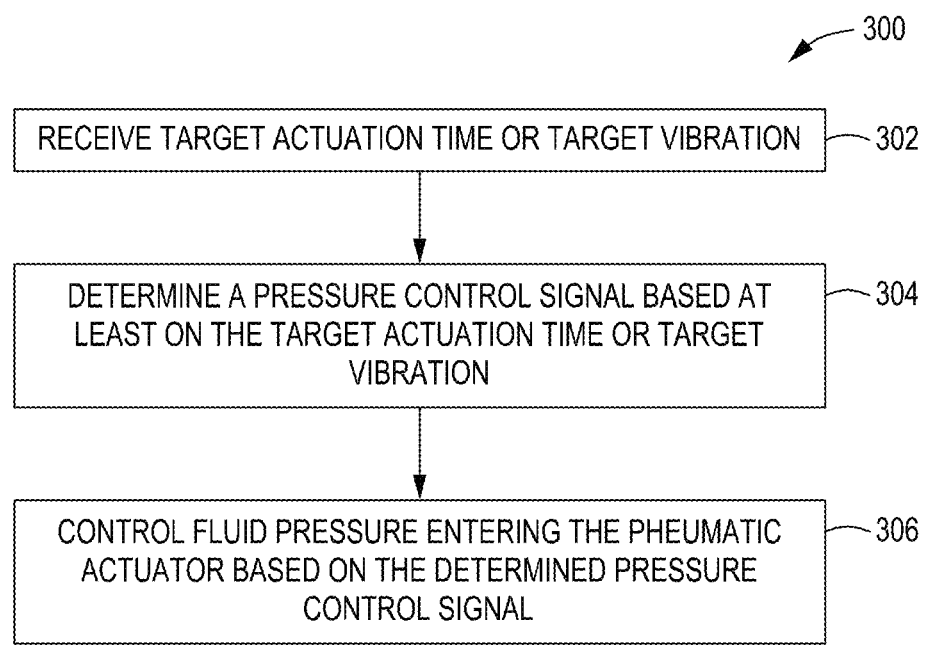
FIG. 3 depicts a method for controlling a slit valve in accordance with some embodiments of the present disclosure.

FIG. 3 shows a method 300 for controlling a slit valve according some embodiments of the disclosure. The slit valve may be the slit valve 111. At block 302, the method 300 may include receiving (e.g., at the controller 112) the target actuation time or target vibration. In some embodiments, the target actuation time or target vibration may be input by a user in an interface (e.g., a graphical user interface (GUI)), which may be an interface of the controller 112. At block 304, the method 300 may include determining (e.g., by the controller 112) a pressure control signal (e.g., pressure control signal 224) based at least on the target actuation time or target vibration. The pressure control signal may be a pressure control setpoint for one or more controllers (e.g., controllers 212) to use to control fluid pressure entering a pneumatic actuator (e.g., pneumatic actuator 202). At block 306, the method 300 may include controlling fluid pressure entering the pneumatic actuator (e.g., entering the pneumatic actuator 202 either from the inlet 214 to close the door 138 or from the outlet 216 to open the door 138) based on the determined pressure control signal.

Figure 4:
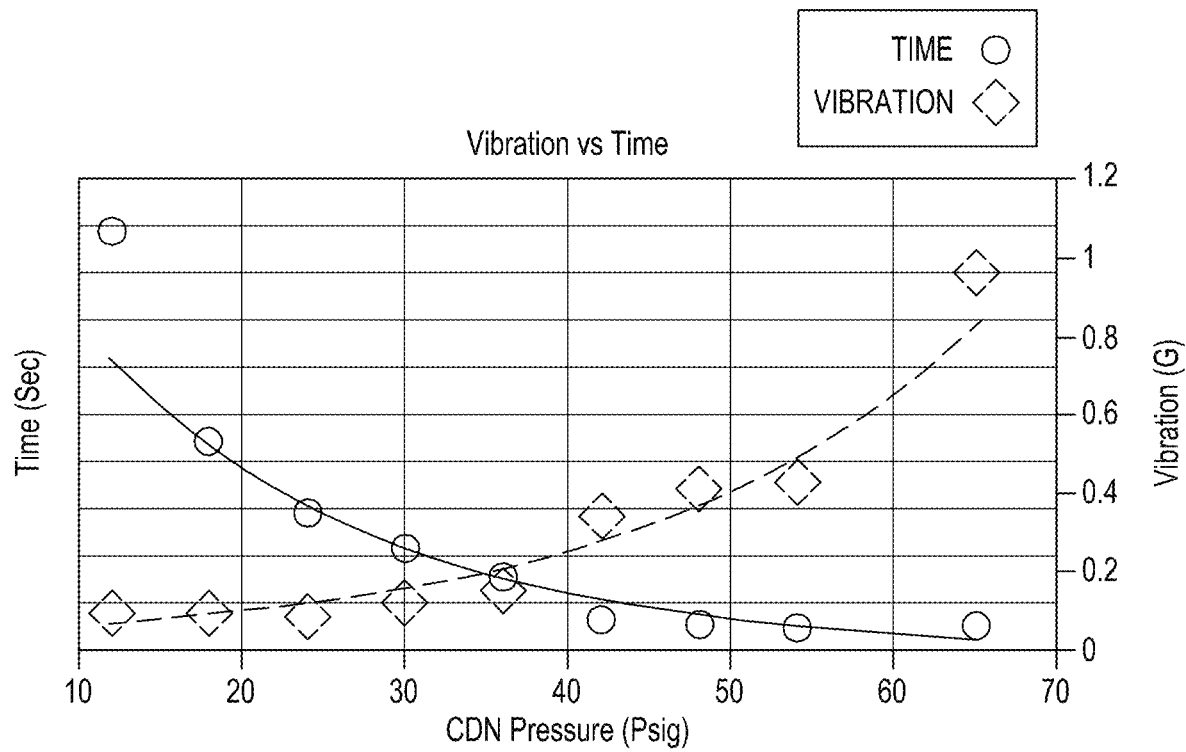
FIG. 4 is a graph of vibration and time vs pressure in accordance with some embodiments of the present disclosure.

In some embodiments, the pressure control signal (e.g., pressure control signal 224) may be based on a functional relationship between target actuation time and pressure of fluid entering the pneumatic actuator 202, or between target vibration and pressure entering the pneumatic actuator 202. In some embodiments, the functional relationship between target actuation time and pressure, and between target vibration and pressure, may be logarithmic, as shown in a non-limiting example in FIG. 4. In some embodiments, and as shown in FIG. 4, target vibration may be proportional to pressure and target actuation time may be inversely proportional to pressure. The relationship between actuation pressure, actuation time, and door vibration can be determined empirically for any given system and such relationship data used in connection with the methods disclosed herein.

In some embodiments, the method 300 may include using a first sensor (e.g., first sensor 218) to sense a first position of a moving member (e.g., moving member 204) corresponding to the open position of the door, and using a second sensor (e.g., second sensor 220) to sense a second position of the moving member corresponding to the closed position of the door, and determining an elapsed time between the first position and the second position. In some embodiments, fluid pressure entering the pneumatic actuator may also be controlled based on the elapsed time. In some embodiments, the method 300 may include comparing the target actuation time and the elapsed time and adjusting the pressure control signal based on the comparing. In some embodiments, and as described above, the target actuation time and target vibration may be functionally related to one another through pressure. Thus, a target actuation time and pressure may correspond to a target vibration at the same pressure. Thus, even if a user inputs a target vibration for control of the slit valve 111, in some embodiments, the controller 112 may compare a target time corresponding to the target vibration with the elapsed time, rather than the target vibration itself.

For example, if the target actuation time is four seconds and the elapsed time is five seconds, it may be determined that the door 138 actuated more slowly than desired using the pressure control signal determined at block 304. In such an example, a correction factor may be applied to the pressure control signal determined at block 304 and used at block 306 the next time the door 138 is actuated. In the example, the correction factor may be based on at least one of the difference between the elapsed time and the target actuation time or the pressure control signal previously determined at block 304, which may have been determined from a functional relationship as discussed previously. In some embodiments, the correction factor may be expressed as a percentage to apply to the pressure control signal, such as to increase or decrease the pressure control signal determined at block 304 to thereby increase or decrease the elapsed time in line with the target actuation time.

The systems and methods described herein provide slit valve control which can control vibration and shock caused by slit valve actuation. As a result, particle generation and substrate movement caused during slit valve operation may be reduced, thereby reducing substrate processing defects and increasing throughput.

While the foregoing is directed to embodiments of the present disclosure, other and further embodiments of the disclosure may be devised without departing from the basic scope thereof.

The invention claimed is:

1. A slit valve system, comprising:
a slit valve body having an opening configured to permit passage of a substrate;
a door in the valve body, configured to transition between an open position and a closed position in which the opening is closed;
a pneumatic actuator coupled to the door, the pneumatic actuator including a moving member configured to exert a force on the door; and
a controller coupled to the pneumatic actuator, the controller configured to control fluid pressure entering the pneumatic actuator based at least on a user-input vibration value of a target vibration of the door.

2. The system of claim 1, further comprising:
a supply line coupled to the pneumatic actuator; and
an exhaust line coupled to the pneumatic actuator,
wherein the controller is coupled to at least one of the supply line or the exhaust line.

3. The system of claim 2, wherein the controller is in line with at least one of the supply line or the exhaust line.

4. The system of claim 1, wherein the controller is configured to receive a pressure control signal.

5. The system of claim 2, further comprising a switching valve coupled to the supply line and the exhaust line between the controller and the pneumatic actuator.

6. The system of claim 1, further comprising a first sensor configured to sense a first position of the moving member corresponding to the open position of the door and a second sensor configured to sense a second position of the moving member corresponding to the closed position of the door.

7. The system of claim 6, wherein the controller is configured to control fluid pressure entering the pneumatic actuator based on an elapsed time between the first sensor detecting the first position and the second sensor detecting the second position.

8. A substrate processing system, comprising:
a first chamber having a first opening;
a second chamber having a second opening; and
a slit valve system coupled between the first opening and the second opening, the slit valve system comprising:
a slit valve body having an opening configured to permit passage of a substrate;
a door in the valve body, configured to transition between an open position and a closed position in which the opening is closed;
a pneumatic actuator coupled to the door, the pneumatic actuator including a moving member configured to exert a force on the door; and
a controller coupled to the pneumatic actuator, the controller configured to control fluid pressure entering the pneumatic actuator based at least on a user-input vibration value of a target vibration of the door.

9. The substrate processing system of claim 1, wherein the slit valve system further comprises:
a supply line coupled to the pneumatic actuator; and
an exhaust line coupled to the pneumatic actuator,
wherein the controller is coupled to at least one of the supply line or the exhaust line.

10. The substrate processing system of claim 9, wherein the controller is in line with at least one of the supply line or the exhaust line.

11. The substrate processing system of claim 8, wherein the controller is configured to receive a pressure control signal.

12. The substrate processing system of claim 9, wherein the slit valve system further comprises a switching valve coupled to the supply line and the exhaust line between the controller and the pneumatic actuator.

13. The substrate processing system of claim 8, wherein the slit valve system further comprises a first sensor configured to sense a first position of the moving member corresponding to the open position of the door and a second sensor configured to sense a second position of the moving member corresponding to the closed position of the door.

14. The substrate processing system of claim 13, wherein the controller is configured to control fluid pressure entering the pneumatic actuator based on an elapsed time between the first sensor detecting the first position and the second sensor detecting the second position.

15. A method for controlling a slit valve comprising:
  a slit valve body having an opening configured to permit passage of a substrate;
  a door in the valve body, configured to transition between an open position and a closed position in which the opening is closed; and
  a pneumatic actuator coupled to the door, the pneumatic actuator including a moving member configured to exert a force on the door; and
  the method comprising:
  receiving a user-input vibration value of a target vibration of the door;
  determining a pressure control signal based at least on the user-input vibration value of the target vibration of the door; and
  controlling fluid pressure entering the pneumatic actuator based on the determined pressure control signal.

16. The method of claim 15, wherein the pressure control signal is based on a functional relationship between target vibration and pressure.

17. The method of claim 16, wherein the functional relationship is logarithmic.

18. The method of claim 15, wherein the slit valve further comprises a first sensor configured to sense a first position of the moving member corresponding to the open position of the door and a second sensor configured to sense a second position of the moving member corresponding to the closed position of the door, and the method further comprises sensing an elapsed time between the first position and the second position.

19. The method of claim 18, wherein fluid pressure entering the pneumatic actuator is controlled based on the elapsed time between the first sensor detecting the first position and the second sensor detecting the second position.

20. The method of claim 19, further comprising comparing a target actuation time corresponding to the target vibration and the elapsed time and adjusting the pressure control signal based on the comparing.

\* \* \* \* \*